United States Patent
Allen

(10) Patent No.: US 7,587,622 B2
(45) Date of Patent: Sep. 8, 2009

(54) POWER MANAGEMENT OF COMPONENTS HAVING CLOCK PROCESSING CIRCUITS

(75) Inventor: Daniel J. Allen, Derry, NH (US)

(73) Assignee: Altera Corporation, San Jose, CA (US)

( * ) Notice: Subject to any disclaimer, the term of this patent is extended or adjusted under 35 U.S.C. 154(b) by 504 days.

(21) Appl. No.: 11/326,423

(22) Filed: Jan. 6, 2006

(65) Prior Publication Data

US 2006/0168461 A1 Jul. 27, 2006

Related U.S. Application Data

(60) Provisional application No. 60/642,505, filed on Jan. 11, 2005, provisional application No. 60/683,789, filed on May 24, 2005.

(51) Int. Cl.
   *G06F 1/00* (2006.01)
(52) U.S. Cl. ............... 713/501; 713/300; 713/320; 713/322; 713/340; 713/600
(58) Field of Classification Search .......... 713/300, 713/320, 322, 340, 600, 500, 501
   See application file for complete search history.

(56) References Cited

U.S. PATENT DOCUMENTS

| 5,592,113 | A |   | 1/1997 | Quiet et al. |
| 5,686,866 | A |   | 11/1997 | Badger |
| 5,696,952 | A | * | 12/1997 | Pontarelli ............ 713/600 |
| 5,815,694 | A | * | 9/1998 | Ganfield et al. ......... 713/501 |

(Continued)

OTHER PUBLICATIONS

PCT International Search Report and Written Opinion in counterpart International Application No. PCT/US06/00350, dated Mar. 20, 2008.

*Primary Examiner*—Thomas Lee
*Assistant Examiner*—Jaweed A Abbaszadeh
(74) *Attorney, Agent, or Firm*—Edell, Shapiro & Finnan, LLC

(57) ABSTRACT

A method and system for managing power consumption of a component that employs a clock processing circuit to produce a processed clock signal used by the component from a clock signal supplied to the clock processing circuit. A frequency of a clock signal supplied to the clock processing circuit is changed based on operating characteristics of a voltage regulator module (VRM) or power supply unit so as to maintain acceptable operating parameters of the power supply unit during a change in frequency of a cock signal. Data pertaining to operating characteristics of the VRM or power supply may be one or both of two forms. In one form, this data is determined a priori from simulations or experiments made on a particular VRM or power supply unit and used to generate and store parameters that are known to optimally (quickly and without degradation of VRM or power supply performance) change the frequency of the clock processing circuit. In another form, the operation conditions of the VRM or power supply unit are monitored in real-time as a frequency transition is occurring. In addition, control signals to a VRM or power supply may be monitored to control how changes are made to the frequency of a clock signal. Further still, the power available from a VRM or power supply is monitored and a clock signal frequency to one or more system components is controlled to balance the load to the power available from the VRM or power supply.

19 Claims, 6 Drawing Sheets

U.S. PATENT DOCUMENTS

| | | | |
|---|---|---|---|
| 5,832,284 A | 11/1998 | Michail et al. | |
| 6,320,424 B1 | 11/2001 | Kurd et al. | |
| 6,690,224 B1 * | 2/2004 | Moore | 327/296 |
| 6,788,156 B2 * | 9/2004 | Tam et al. | 331/49 |
| 6,927,605 B2 * | 8/2005 | Fetzer et al. | 327/101 |
| 6,996,730 B2 * | 2/2006 | Bonnett | 713/322 |
| 7,000,130 B2 * | 2/2006 | Adachi | 713/322 |
| 7,012,454 B2 * | 3/2006 | Matsui et al. | 327/114 |
| 7,042,258 B2 * | 5/2006 | Booth et al. | 327/115 |
| 7,346,791 B2 * | 3/2008 | Kato et al. | 713/322 |
| 2004/0103330 A1 | 5/2004 | Bonnett | |
| 2007/0006007 A1 * | 1/2007 | Woodbridge et al. | 713/322 |

* cited by examiner

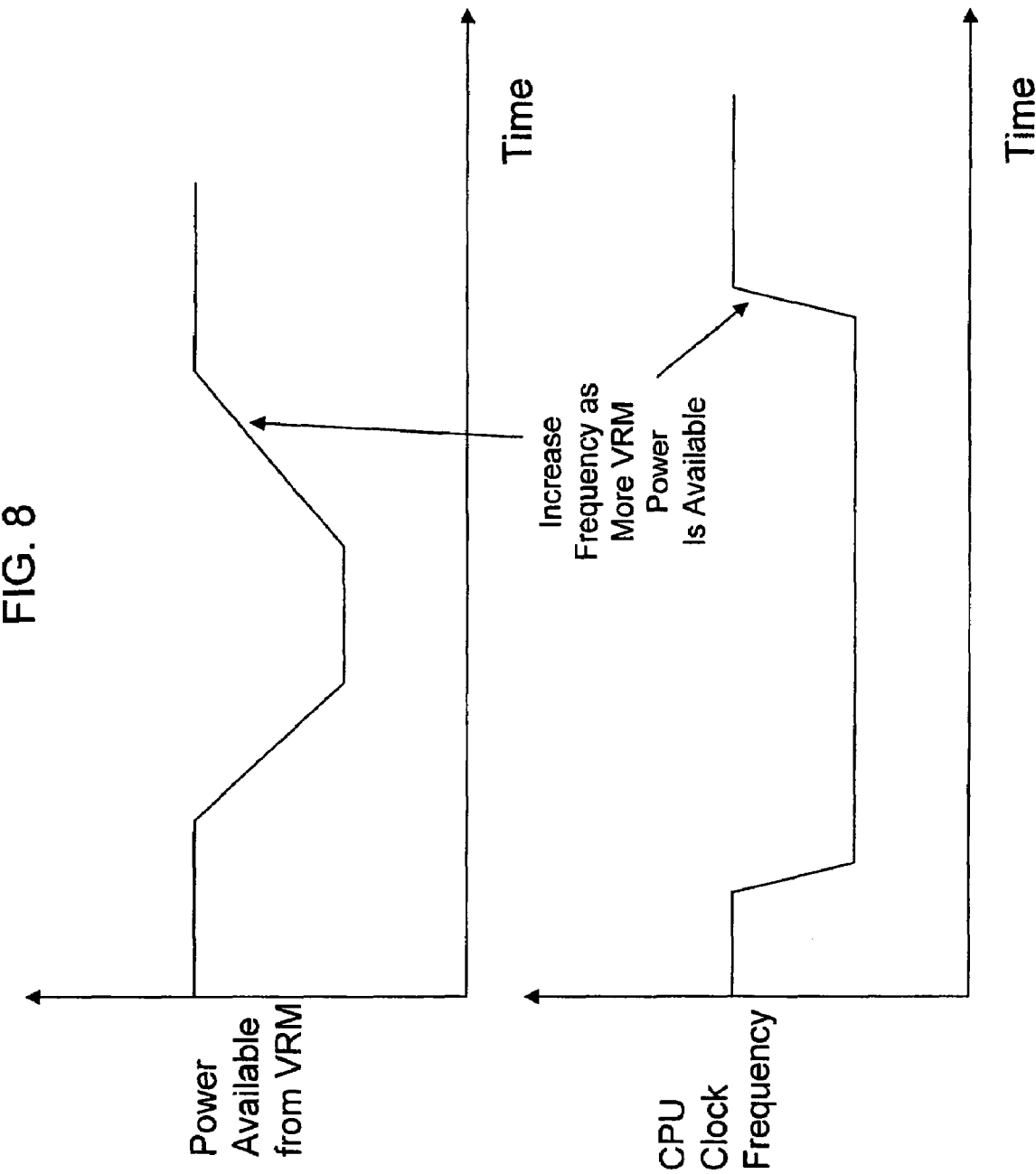

POWER MANAGEMENT OF COMPONENTS HAVING CLOCK PROCESSING CIRCUITS

RELATED APPLICATIONS

This application claims priority to U.S. Provisional Application No. 60/642,505 filed Jan. 11, 2005 and to U.S. Provisional Application No. 60/683,789, filed May 24, 2005. The entirety of each of these applications is incorporated herein by reference.

BACKGROUND OF THE INVENTION

Modern computer systems are capable of very high performance. Power consumption generally increases with increased performance. Often, less than maximum performance is adequate for a particular use or computer application, though many computer systems still unnecessarily operate at higher performance levels, thus wasting power and reducing battery life of portable devices. Ideally, the computer system's performance would be adjusted to meet the application's need while minimizing power usage.

FIG. 1 shows an example of a system in which a central clock integrated circuit (IC) or chip 20 generates one or more clock signals, each of which is supplied to a corresponding system component 100(1) to 100(N). Examples of system components are a processor, memory controller and PCI bus controller. Each system component 100(1) to 100(N) may have its own clock processing circuit 110(1) to 110(N) that is a consumer or user of a clock signal supplied by the central clock chip 20. Examples of clock processing circuits are phase lock loop circuits (PLL) and delay locked loop circuits (DLLs). A clock processing circuit may increase, decrease or maintain the same the frequency of the clock signal supplied to it by the central clock chip 20, depending on the particular system component. For purposes of clarity, a clock signal supplied to a clock processing circuit 110(1) to 110(N) from the central clock chip 20 is called a central clock signal. The central clock chip 20 may generate several central clock signals. The clock signal that is generated by the clock processing circuit in a system component is called a processed clock signal. The other elements in a system component operate on the processed clock signal(s) generated by the clock processing circuit contained therein.

Techniques exist to reduce computer system performance when the processing demands are low. Reducing computer system performance is usually done by reducing the frequency of the processed clock signal internally used by various system components, such as the processor, memory and busses because these components consume power on every clock cycle. For example, as shown in FIG. 2, the processed clock signal for a processor is reduced when the operating system enters an idle state. Ideally, the frequency during the idle state would be as low as possible and switching between frequencies would be instantaneous. When interrupts or signals occur, demanding the processor's attention, the frequency of the processed clock signal for the processor is returned to the maximum or some desired frequency. The power a computer system saves depends on the time duration of reduced performance (at the lower clock frequency) and how much the performance has been reduced, i.e., how low the processed clock frequency is made.

Computer systems have complex clocking systems, typically with a central clock chip driving many system components as shown in FIG. 1. The clock processing circuit in some system components, such as a processor, is a PLL that converts (multiplies) a central clock signal to a higher frequency.

A multiplying PLL introduces limits on the range of frequencies the PLL can achieve and how quickly it can transition from one frequency to another. This is due in part to filter circuits in the PLL that limit the rate of change and may introduce instability when changing frequencies rapidly. A common problem with PLLs is called overshoot (or undershoot), where a PLL may as a consequence of a frequency change, generate a frequency higher (or lower) than the system maximum, causing system failures. FIG. 3 illustrates the overshoot problem. To avoid this problem, computer systems are designed to limit the rate of frequency change. This leads to an unfortunate tradeoff: slow response from the system when returning to full speed versus limiting the amount of frequency reduction and thus reducing power savings.

A better solution is to adjust for the characteristics of the clock processing circuit (e.g., PLL, DLL, etc.) when changing the frequency of the central clock signal to achieve the fastest possible frequency transitions for the processed clock signal. Faster transitions mean that, for a given response time, the power savings associated with operation at a lower frequency can be maximized.

SUMMARY OF THE INVENTION

Briefly, a method and system are provided for managing power consumption of a component that employs a clock processing circuit to produce a processed clock signal used by the component from a clock signal supplied to the clock processing circuit. A frequency of a clock signal supplied to the clock processing circuit is changed based on operating characteristics of the clock processing circuit so as to maintain acceptable operating parameters of the clock processing circuit during a change in frequency. Examples of a clock processing circuits are phase lock loop circuits (PLLs) and delay locked loop circuits (DLLs).

Data pertaining to operating characteristics of the clock processing circuit may be take one or both of two forms. In one form, this data is determined a priori from simulations or experiments made on a particular clock processing circuit and used to generate and store parameters that are known to optimally (quickly and without degradation of clock processing circuit performance) change the frequency of the clock processing circuit. In another form, the operation conditions of the clock processing circuit are monitored in real-time as a frequency transition is occurring. Alternatively, both stored and real-time monitored data may be used to control the frequency transition of the clock processing circuit.

These techniques may be used to control changing of the frequency of each of a plurality of clock signals supplied to respective clock processing circuits, where the control of a clock signal may be independent of other clock signals or dependent on another clock signal or clock processing circuit.

Similarly, the clock frequency of a clock signal may be changed according to operating conditions of a power supply or voltage regulator module (VRM) that supplies power to one or more components associated with the clock processing circuit. Parameters may be stored that describe the operating characteristics of the VRM and these parameters are used to control how fast the clock signal is changed to be sure it does not occur too fast to cause a power regulation problem. Alternatively, the operating conditions of the VRM may be monitored in real-time and the clock frequency transitions are controlled in such a manner to maintain proper regulation performance throughout the transition.

Control signals to the VRM may be monitored to determine changes made to the frequency of one or more clock signals. Further still, the frequency of a clock signal to a system component may be changed according to the power available from a VRM in order to balance the load to the power availability from the VRM. Power availability of a VRM may be determined by monitoring the switching rate or voltage level of the VRM.

Other objects and advantages will become more apparent when reference is made to the following description taken in conjunction with the accompanying drawings.

BRIEF DESCRIPTION OF THE DRAWINGS

FIG. 8 is a timing diagram that illustrates operation of the system shown in FIG. 7.

DETAILED DESCRIPTION

Figure 4:
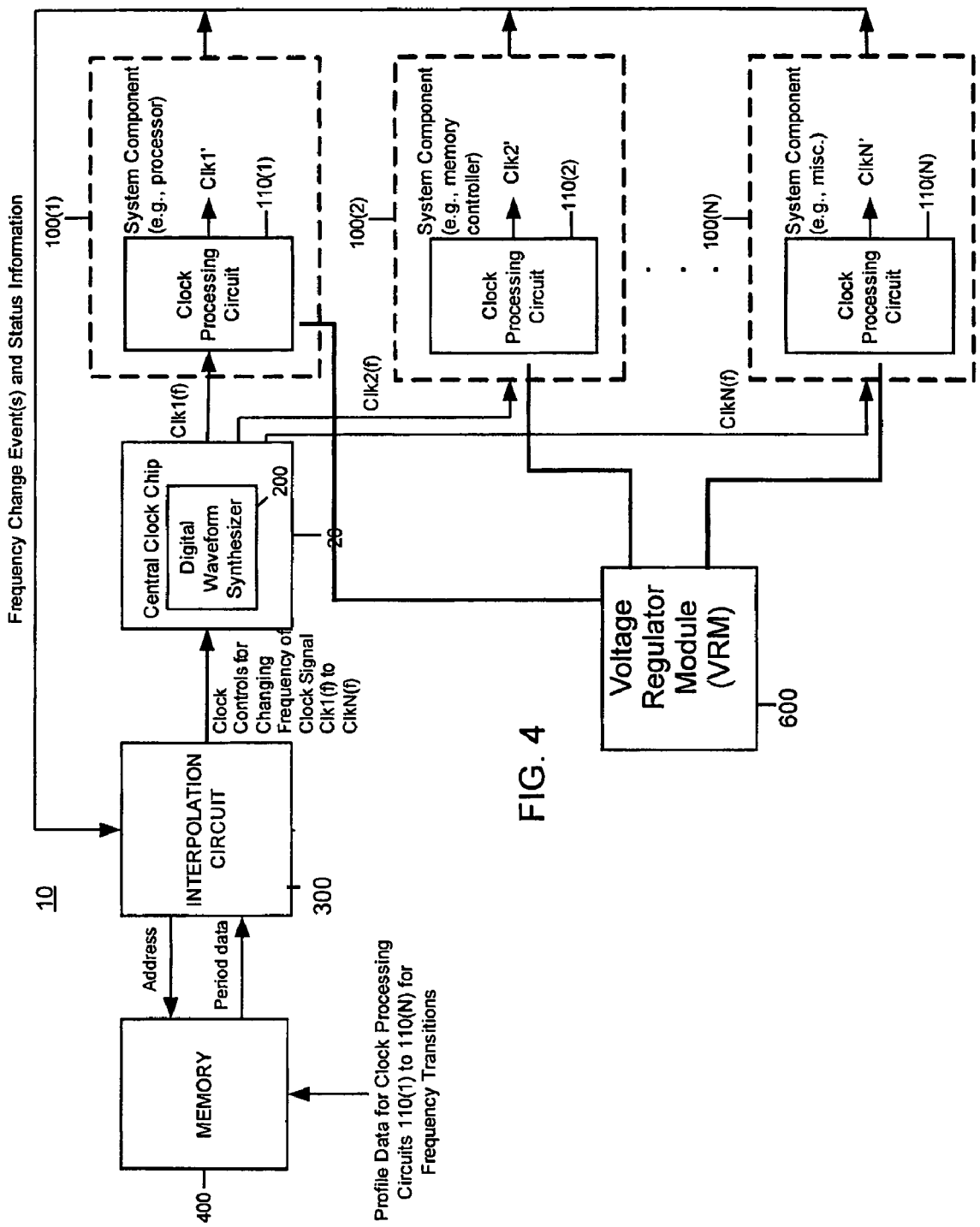
FIG. 4 is a block diagram of a system that optimizes the manner in which the frequency of a clock processing circuit is changed using stored profile data for the clock processing circuit and/or voltage regulator module.

Referring first to FIG. 4, a system 10 is shown comprising a plurality of computer system components 100(1) to 100(N), such as a processor or memory controller, a central clock chip 20, an interpolation circuit 300 and a memory 400. Each system component comprises a corresponding clock processing circuit 110(1) to 110(N), such as a PLL, DLL, etc. The central clock chip 20 comprises a digital waveform synthesizer circuit 200 that can produce edges at a very precisely control time instant. From these edges, the waveform synthesizer circuit 200 can generate one or more (independent of interdependent) clock signals indicated as Clk1($f$), Clk2($f$) to ClkN(f) that are supplied to corresponding system components 110(1) to 110(N), respectively. An example of a suitable waveform synthesizer circuit 200 is described in commonly assigned U.S. Pat. Nos. 6,377,094 and 6,664,832, entitled "Arbitrary Waveform Synthesizer Using a Free-Running Oscillator". The entirety of each of these patents is incorporated herein by reference. The waveform synthesizer described in these patents is capable of changing the frequency of the clock signal that it generates every clock cycle in response to an input period value, where as known in the art, the period T of a signal is inversely related to the frequency of the signal (T=1/f).

Each clock processing circuit 110(1) to 110(N) processes the corresponding incoming clock signal Clk1($f$) to ClkN(f) that it receives from the central clock chip 20 and produces a processed clock signal denoted Clk1' to ClkN'. For example, if the clock processing circuit 110(1) is a PLL, it multiples the frequency of the signal Clk(f) by some multiple K (which may be a fraction or integer) to produce a clock signal Clk(f× K) at the desired frequency for operation of the component 100. A clock processing circuit may produce a processed clock signal that is at the same frequency as the clock signal supplied thereto.

The memory 400 is, for example, a random access memory (RAM) that stores profile data for frequency transitions of the each of the clock processing circuits 110(1) to 110(N). For example, if the digital waveform synthesizer 200 is the arbitrary waveform synthesizer described in the aforementioned patents, the profile data may consist of a table of period data values, each period data value corresponding to clock frequency values or points (f=1/T) associated with a change in frequency of a clock signal Clk(1) to Clk(N) to be supplied to clock processing circuits 110(1) to 110(N), respectively. These period data values are data points that describe a transition of the frequency of a clock signal produced by the digital waveform synthesizer 200 that are determined, through experimentation or simulation on a particular clock processing circuit, to optimally change the frequency of the processed clock signal produced by the particular clock processing circuit. For example, the period data values stored in the memory 400 will describe a frequency transition that is initially fast until the frequency approaches the final or destination frequency, at which point the change in frequency is slowed, to avoid overshoot (or undershoot) or otherwise compromise the operating conditions of the clock processing circuit.

Using one of a variety of interpolation techniques, such as linear interpolation, the interpolation circuit 300 generates additional period data points from the period data values stored in the memory 400 to more completely describe the transition of the frequency of the clock signal Clk(f). The interpolation circuit 300 supplies this more complete set of period data values to the digital waveform synthesizer 200 to thereby control what the frequency of the one or more clock signals Clk1($f$) to ClkN(f). As explained above, the digital waveform synthesizer 200 may change the frequency of the clock signals Clk1($f$) to ClkN(f) in response to period data values it receives from the interpolation circuit 300.

From time to time, one or more of the system components 100(1) to 100(N) may change its performance level and consequently the frequency of the processed clock signal needed from its respective clock processing circuit 110(1) to 110(N). The system component generates a frequency change event signal when a change in performance level occurs. For example, the system component 100 may switch from a higher performance mode to an idle or lower performance mode. The frequency of the processed clock signal for the lower performance mode is lower than that of the maximum performance mode. Similarly, the system component may switch from a lower performance mode to a higher performance mode. A system component may have several performance levels (e.g., maximum, high, medium, low and minimum), each of which has a corresponding appropriate processed clock signal frequency.

Figure 1:
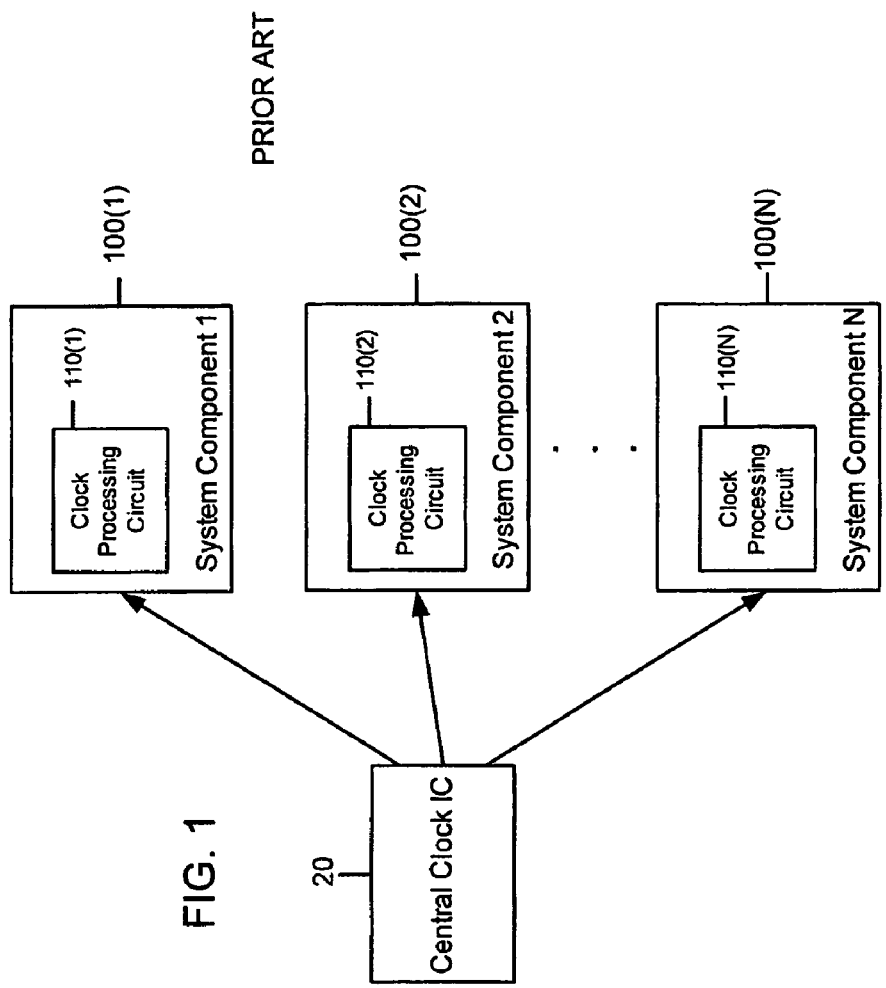
FIG. 1 is a diagram illustrating how a computer system may switch between a high performance/high power consumption mode and a low performance/low power consumption (idle) mode.
Figure 2:
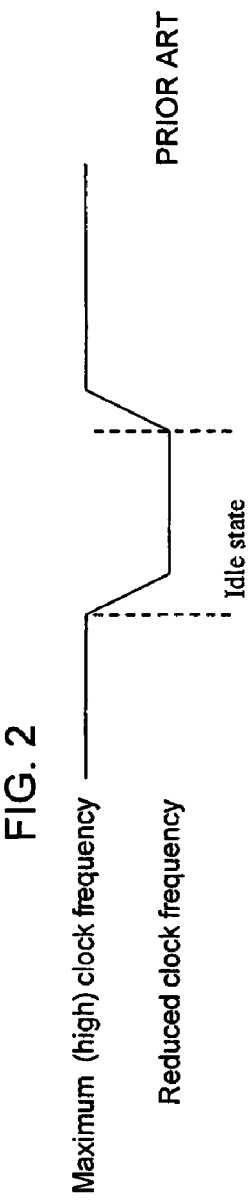
FIG. 2 is a block diagram showing computer system components driven by a central clock chip.
Figure 3:
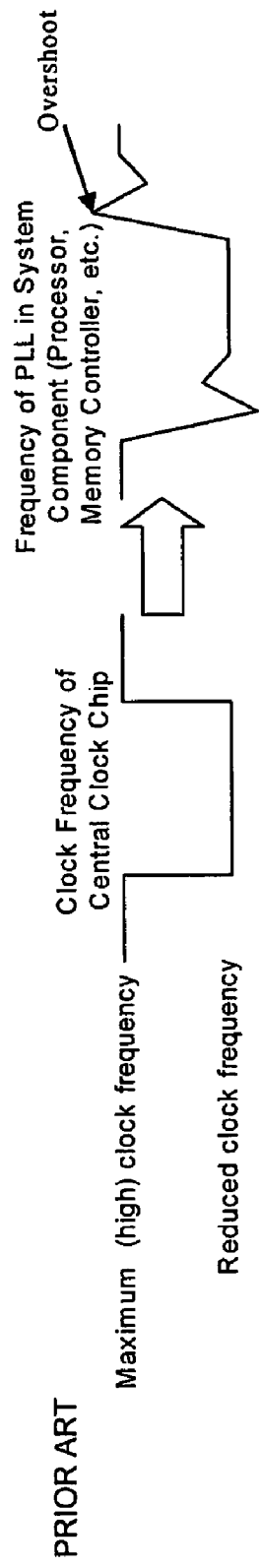
FIG. 3 is a diagram showing how changes in a phase lock loop (PLL) circuit frequency is driven by changes in the frequency of a central clock signal.
Figure 5:
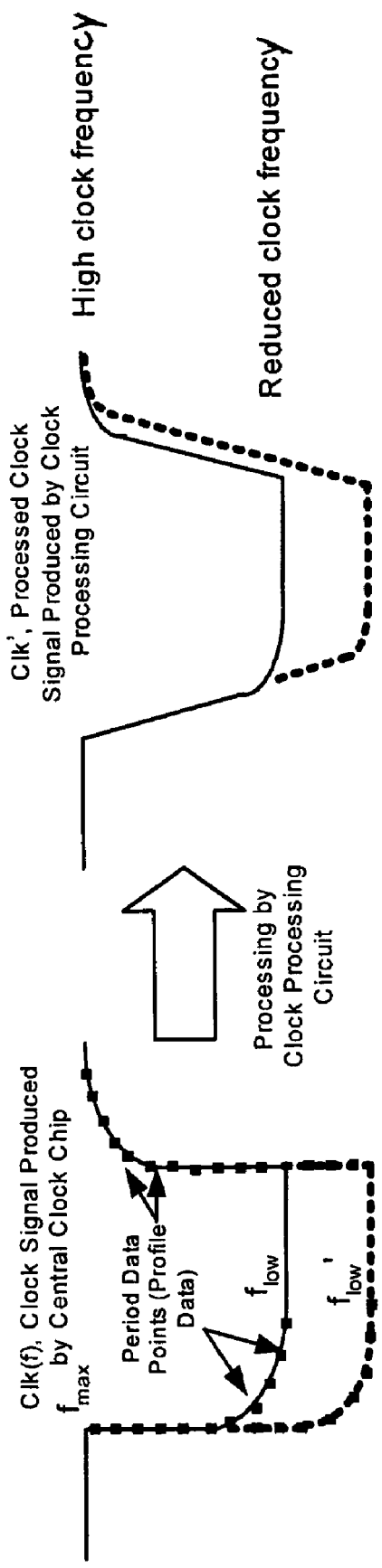
FIG. 5 is a diagram showing how the frequency of a clock signal supplied to a clock processing circuit is changed so as to maintain acceptable operating parameters of the clock processing circuit.

Reference is made to FIG. 5 in conjunction with FIG. 4 for an explanation of the operation of the system 10. When any one or more of the system components 100(1) to 100(N) generates a frequency change event (either switching to a higher performance level or to a lower performance level), the interpolation circuit 300 retrieves profile data (e.g., period data points) from the memory 400 associated with the desired transition (from high frequency to low frequency, or low frequency to high frequency) for the clock processing circuit of the system component undergoing the change. The interpolation circuit 300 then generates clock controls, in the form of a more complete set of period data values, and supplies these controls central clock chip 20. Based on the controls received from the interpolation circuit 300, the digital waveform synthesizer 200 changes (either up or down) the frequency of the clock signal supplied to the clock processing circuit of the system component involved in the change. The clock processing circuit in response changes the frequency of the processed clock signal that it generates.

When a system component changes its level of performance, the central clock chip 20 is controlled to change the frequency of the clock signal supplied to that system component in such a manner so as to maintain acceptable operating parameters of the clock processing circuit. In this way, the central clock chip 20 matches the clock processing circuit characteristics when it changes the frequency of the clock signal to achieve the fastest possible frequency transitions of the corresponding processed clock signal within the operating parameters of that clock processing circuit. By reducing the time required to make a frequency transition of the processed clock signal, the amount of time at a lower frequency can be maximized, thus in turn maximizing the power savings in a lower performance mode. Moreover, to avoid overshoot (or undershoot), the profile data stored in the memory 400 may describe a frequency transition of the clock signal to the clock processing circuit that is relatively fast up until it reaches its final frequency (end of the frequency range), at which point the rate of change of the frequency is reduced or slowed down until the final frequency is reached.

Using the techniques described herein, the time required for transitioning the frequency of a clock processing circuit can be greatly reduced. Therefore, the amount of time a clock processing circuit can spend at a lower frequency can be increased, thereby increasing the amount of power savings by operating in a lower power consumption mode for a longer period of time. Moreover, because the frequency transition (from low to high, and high to low) can occur faster, it may also be possible to reduce the frequency of the clock processing circuit even further and still maintain desirable system component response times. This is shown by the dotted traces in FIG. 5, wherein the frequency of a clock signal produced by the central clock chip may be made to go to an even lower frequency, $f_{low}'$, causing the clock processing circuit to transition to a corresponding lower frequency.

The ability to reduce the time required for transitioning between frequencies using the techniques described herein may not apply for all PLLs. The limiting factor is the PLL that receives the clock signal from the central clock chip. Not all PLLs can be forced to complete a frequency change faster. However, controlling the frequency changes of the clock signal to the PLL in the manner described herein is better than a completely linear change of frequency. Most (if not all) of the frequency transition can be expedited using these techniques for most PLLs. For example, if a clock signal frequency for a clock signal supplied to a system component is increased to increase performance of that system component, the available CPU cycles will be greater during the transition, even though the transition may not be completed any faster.

As a further feature, the clock signals generated by the central clock chip 20 may be independent or interdependent of one another. Consequently, the central clock chip 20 may control the transition of the frequency of one clock signal independent of any other clock signal, or dependent on the status of another clock signal or of the system component driven by another clock signal. An example is where one system component, such as system component 100(1) is a processor and another system component 100(2) is a memory controller. It may be necessary that when the processor is switched to a lower power mode, the memory controller first be switched to a lower power mode after the processor. In this case, data is stored in the memory 400 to cause initiation of the downward transition of the clock signal Clk2($f$) to the clock processing circuit 110(2) of the system component 100(2) is a predetermined period of time after the clock signal Clk1($f$) to the clock processing circuit 110(1) of the system component 100(1) is at a lower frequency. Conversely, when an event occurs necessitating switching the processor from a lower power mode to a higher power mode, data is stored in the memory 400 to cause initiation of the upward transition of the clock signal Clk2($f$) to the clock processing circuit 110(2) of system component 100(2), e.g., memory controller, to a higher frequency before the upward transition of the Clk1($f$) to the clock processor circuit 110(1) of system component 100(1), e.g., processor, is initiated. Thus, the transitioning of the frequency of one clock processing circuit may have (time specific) priority over transitioning the frequency of another clock processing circuit.

Furthermore, with continued reference to FIG. 4, the memory 400 may also store parameters that account for the operation of a voltage regulator module (VRM) 600 during a power transition (up or down). The VRM 600 supplies power (voltage or current) to the system components 100(1) to 100(N). When one of these system components changes its clock rate, thereby changing its power draw, it would be advantageous to moderate the manner in which the central clock chip 20 changes the frequency of the clock signal so that the VRM 600 can "keep up" with the changes in the power draw as the frequency of that clock signal changes. The interpolation circuit 300 controls the frequency transition of the clock signal to the one or more system components undergoing a power change based on the stored parameters for (a) the clock processing circuit in that system component, and (b) the VRM 600.

For example, at full clock speed, a system component such as a processor, may draw as much as 50 A of current and at half clock speed, the processor may draw as little as 25 A. Switching between these two speeds in a microsecond means that the VRM 600 needs to maintain regulation while switching at a rate of 25 A per microsecond, which can difficult. If the operation of the VRM 600 is characterized, particularly during a power draw transition of this type, then the change in frequency of the clock signal supplied to that system component can be controlled to occur at the proper rate (and not too fast) so as not to cause power regulation problems. There may be multiple VRMs and the interpolation circuit 300 may be configured to control changes in clock signal frequencies to account for the operational profile of each VRM.

Figure 6:
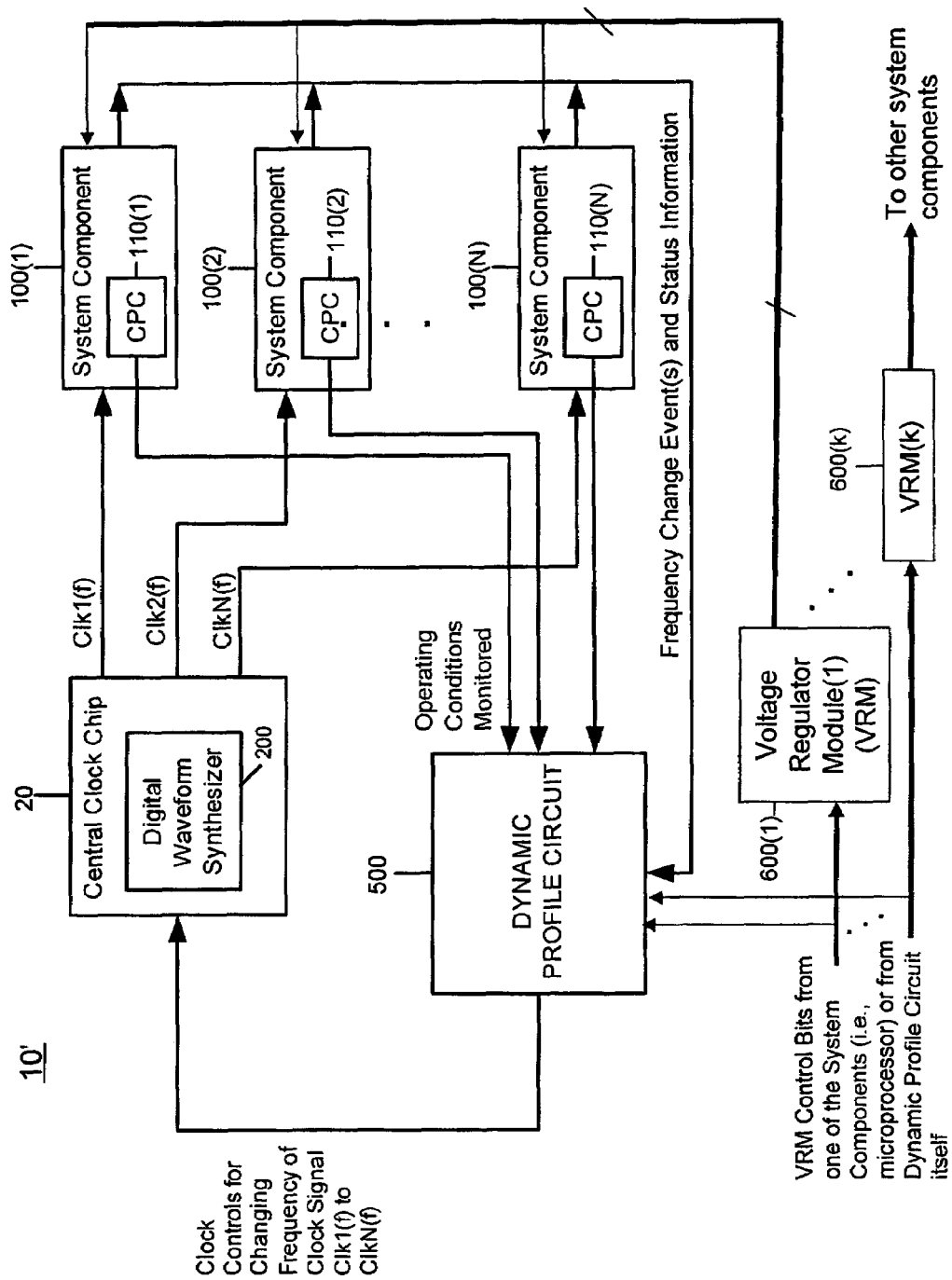
FIG. 6 is a diagram of a system that optimizes the manner in which the frequency of a clock processing circuit is changed by monitoring operating conditions of the clock processing circuit and/or voltage regulator module.

Turning to FIG. 6, another embodiment is shown in which the operating conditions of the clock processing circuits in the system components are continuously monitored to manage frequency transitions. The system 10' in FIG. 6 is similar to FIG. 5, except it includes a dynamic profile circuit 500 instead of the interpolation circuit 300 and memory 400. The dynamic profile circuit 500 is coupled to the clock processing circuits and monitors their operation conditions. For example, as is known in the art, a PLL includes a phase comparator that outputs a phase error signal that is a measure of the difference or error between the phase of the incoming clock signal, Clk($f$), and the processed clock signal Clk'. Thus, the phase comparator output signal indicates how well the internal clock signal Clk($f$x$N$) produced by the PLL tracks or follows the incoming clock signal Clk($f$). By monitoring the status of the phase comparator output signal, the dynamic profile circuit 50 can determine on a real-time basis the current operating conditions of the PLL.

The dynamic profile circuit 500 uses the information that it gathers from monitoring the clock processing circuits to determine how fast it can push the clock processing circuit during a frequency transition in response to a frequency change event of the system component. Thus, as opposed to using parameters determined a priori about the clock processing circuit(s) for purposes of managing frequency transitions, as shown in FIG. 4, the system in FIG. 6 uses real-time monitoring of the clock processing circuit(s) operating conditions to adjust the rate at which it changes the frequency of the clock signal thereto. In the case of a PLL as an example, when the phase comparator output signal is relatively small in magnitude, the dynamic profile circuit 500 may maintain or increase the rate of change of the frequency of the clock signal supplied to that PLL. On the other hand, when the phase comparator output signal is relatively large in magnitude, the dynamic profile circuit 500 may reduce the rate of change of the frequency of the clock signal. In this manner, the dynamic profile circuit 500 can moderate how it changes the frequency of the clock signal supplied to a clock processing circuit to optimally change the frequency of the processed clock signal produced by that clock processing circuit.

The system configuration shown in FIG. 6 may also be applied to controlling the rate at which a clock signal is changed according to operating conditions of the VRM 600 or each of a plurality of VRMs 600(1) to 600(k). The dynamic profile circuit 500 may monitor operating conditions of the VRM 600 and control the slew rate for the clock signal supplied to the particular system component that is undergoing a clock rate change to ensure that the clock signal frequency changes based on the ability of the power supply, e.g., VRM 600, to adapt to the changing load.

Normally, a VRM is required to maintain a voltage level, specified by the VRM control bits or signals supplied to it. The source of the VRM control bits may be a system component, such as a microprocessor, or the dynamic profile circuit 500. The VRM maintains this voltage level according to the VRM control bits within a small percent of error, such as less than 5%. Large, rapid increases or decreases in the VRM load make it difficult for the VRM to maintain these proper voltage levels. For example, in battery-powered devices, the battery may be the limiting factor, especially during device start-up. As a result, computer manufacturers add battery cells to provide sufficient start-up power. Using the techniques described herein, it is possible to start-up the device at a lower clock rate to reduce the start-up current demand, and gradually bring the device to full power.

The dynamic profile circuit 500 either uses the VRM control bits it generates, or receives as input the VRM control bits generated by another component (e.g., microprocessor) to control changing of the clock frequency to one or more system components. The manner in which the frequency of a clock signal is changed is based on the VRM control bits driving the VRM. Higher voltage levels allow chips to run faster. When the VRM control bits change, the dynamic profile circuit in response changes the frequency of one or more clock signals to appropriate levels, and also adjusts how it changes the frequency of the one or more clock signals.

Figure 7:
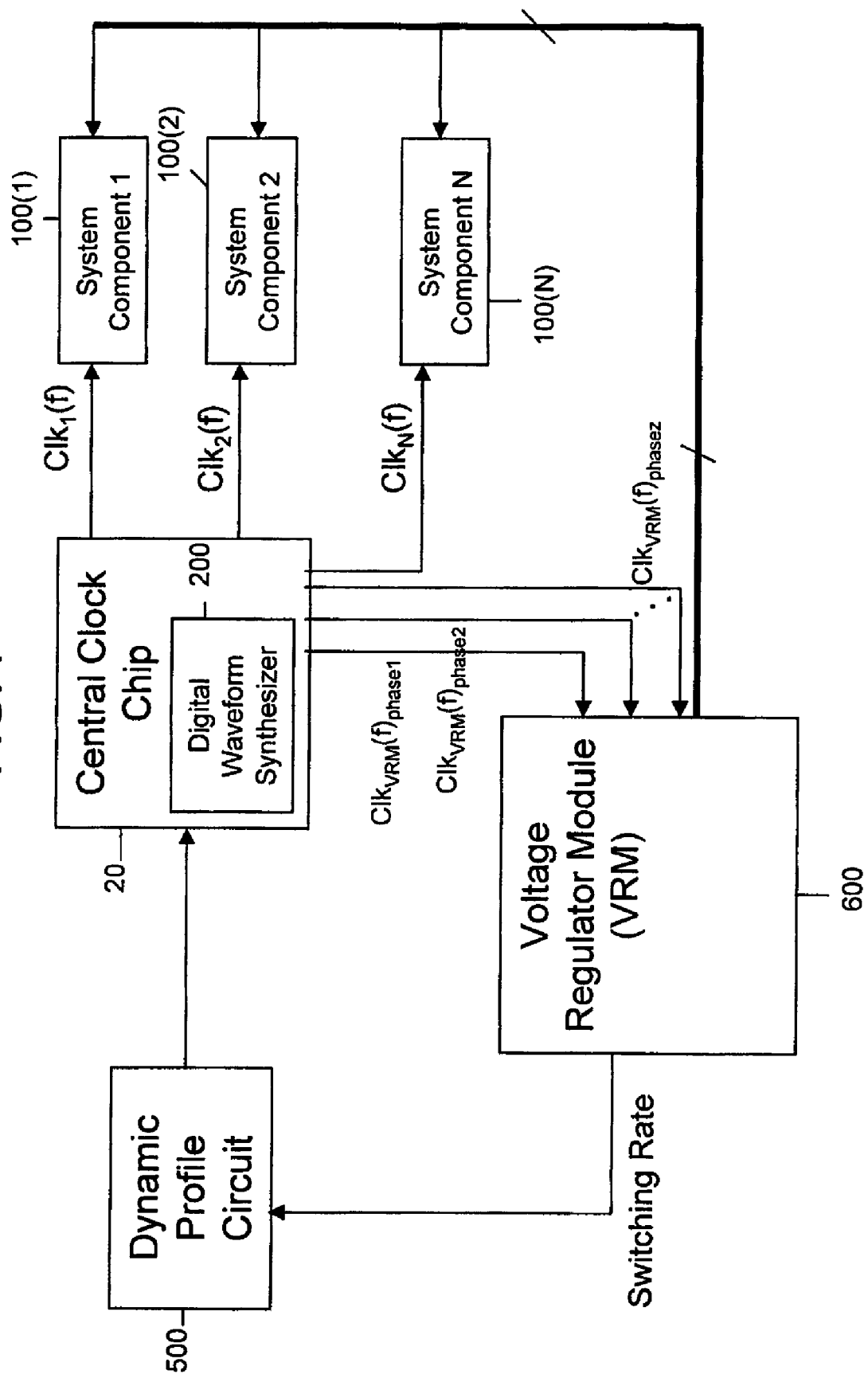
FIG. 7 is a diagram of a system that controls the frequency of a clock signal to a system component based on power available from a voltage regulator module.

Turning to FIGS. 7 and 8, a further refinement to the concepts shown in FIG. 6 is described. According to this refinement, the clock frequency is changed based on the switching rate on the bypass capacitors of the VRM in order to balance the load according to the power available from the VRM. Currently, a VRM attempts to maintain a constant level regardless of changes in the load conditions. The VRM uses a high switching rate for the power field effect transistors (FETs) and large capacitors in order to provide current between the switching cycles. Using the techniques described herein, the dynamic profile circuit monitors the switching rate of the VRM, which is indicative of the available power of the VRM, to rapidly change the clock frequency to one or more system components and to the VRM itself to balance the load to the power available from the VRM. In addition, since many VRMs are multiple phase devices, the central clock chip supplies multiple phases of the clock signal to the VRM, as shown in FIG. 7.

FIG. 8 shows that the dynamic profile circuit changes the frequency of the clock signal to the CPU (an example of one type of system component) on an ongoing basis as the power availability of the VRM changes. The frequency of the clock signal to the CPU is controlled to increase only after more VRM power becomes available. The adjustment of the clock frequency to a system component based on VRM power availability may be according to a programmed profile (i.e., an interpolation circuit such as that shown in FIG. 4) and/or by monitoring the voltage level or switching rate of the VRM as shown in FIG. 7. For example, the CPU clock frequency can be changed at a cycle rate of over 100 kHz.

The concepts described above with respect to independently controlling the frequency transitions of multiple clock processing circuits and interdependently controlling the frequency transitions of multiple clock processing circuits may also be performed by the system 10' using the dynamic profile circuit 500.

The system 10' has the same advantages that system 10 of FIG. 4 has over existing frequency transition methods for power management. That is, by using real-time monitoring operating conditions of clock processing circuits, the rate of frequency transitions can be increased. Consequently, the time spent at a lower frequency/lower power consumption mode can be extended.

The features of system 10 and system 10' may be combined whereby both stored clock processing circuit profile data determined a priori for a particular clock processing circuit and real-time monitoring of the operating conditions of the clock processing circuit are used to control the frequency transitions of the clock processing circuit.

The above description is intended by way of example only.

What is claimed is:

1. A method for generating a clock signal supplied to and processed by a clock processing circuit comprising:
    generating digital period values each of which describes a period of the clock signal at a cycle of the clock signal, wherein the clock signal is produced by a digital waveform synthesizer that is capable of changing a frequency of the clock signal every clock cycle in response to a digital period value received as an input thereto;
    changing the digital period values supplied as input over time to the digital waveform synthesizer in order to change the frequency of the clock signal according to an operating characteristic of the clock processing circuit so as to maintain acceptable operating parameters of the clock processing circuit during a change in frequency of the clock signal.

2. The method of claim 1, wherein the clock processing circuit is a phase lock loop circuit, and wherein changing comprises changing a frequency of the clock signal supplied to the phase lock loop circuit.

3. The method of claim 1, wherein the clock processing circuit is a delay lock loop circuit, and wherein changing comprises changing a frequency of the clock signal supplied to the delay lock loop circuit.

4. The method of claim 1, wherein changing comprises changing the digital period values according to a set of digital period values that correspond to data points of a transition of the frequency of the clock signal produced by the digital waveform synthesizer, which set of digital period values is determined to maintain acceptable operating parameters of the clock processing circuit while changing of the frequency of the clock signal.

5. The method of claim 1, wherein changing comprises changing the frequency of the clock signal between two or more different frequencies to thereby change the frequency of the processed clock signal between two or more different frequencies.

6. The method of claim 4, wherein changing comprises changing the digital period values based on stored digital period values describing parameters for changes to the frequency of the clock signal determined to achieve a change in the frequency of a processed clock signal produced by the clock processing circuit within the acceptable operating parameters of the clock processing circuit.

7. The method of claim 4, and further comprising monitoring at least one operating condition of the clock processing circuit.

8. The method of claim 7, wherein changing comprises changing the digital period values based on the at least one operating condition of the clock processing circuit determined from monitoring the clock processing circuit and based on the stored data.

9. The method of claim 7, wherein monitoring comprises monitoring a signal representing a phase or delay difference between the processed clock signal and another signal.

10. The method of claim 7, wherein changing comprises maintaining the same or increasing the rate of change of the frequency of the clock signal based on the at least one operating condition of the clock processing circuit.

11. The method of claim 1, wherein changing comprises changing the digital period values so as to change the frequency of the clock signal at a faster rate during a first time interval of a frequency transition and changing the frequency of the clock signal at a slower rate during a second time interval of the frequency transition.

12. The method of claim 11, wherein the second time interval corresponds to a point at which the frequency of the clock signal has nearly achieved a desired different frequency.

13. A system for managing a component employing a clock processing circuit that generates a processed clock signal used by the component, comprising:

a clock circuit that supplies a clock signal to the clock processing circuit, wherein the clock circuit comprises a digital waveform synthesizer circuit that generates the clock signal at a frequency based on digital period values supplied as input to the digital waveform synthesizer circuit, wherein each digital period value describes a period of the clock signal at a cycle of the clock signal, and wherein the digital waveform synthesizer circuit is capable of changing the frequency of the clock signal every clock cycle in response to a digital period value received as input thereto; and a control circuit coupled to the clock circuit that supplies digital period values to the digital waveform synthesizer circuit in order to change the frequency of the clock signal according to at least one operating characteristic of the clock processing circuit so as to maintain acceptable operating parameters of the clock processing circuit when changing a frequency of the clock signal.

14. The system of claim 13, and further comprising a memory that stores a plurality of digital period values that correspond to data points of a transition of the frequency of the clock signal produced by the digital waveform synthesizer circuit, which plurality of digital period values is determined to achieve a change in the frequency of a processed clock signal produced by the clock processing circuit within the acceptable operating parameters of the clock processing circuit.

15. The system of claim 14, wherein the control circuit receives as input a signal representing at least one operating condition of the clock processing circuit and supplies digital period values to the clock circuit for changing the frequency of the clock signal based on the at least one operating condition of the clock processing circuit.

16. The system of claim 15, wherein the control circuit receives as input a signal representing a phase or delay difference between the processed clock signal and another signal.

17. The system of claim 14, wherein the control circuit receives a signal that represents at least one operating condition of the clock processing circuit while in operation.

18. The system of claim 17, wherein the control circuit changes the frequency of the clock signal based on said signal that represents at least one operating condition of the clock processing circuit and based on the data stored in said memory.

19. The system of claim 17, wherein the control circuit receives said signal that represents a phase or delay difference between the processed clock signal and another signal.

* * * * *

UNITED STATES PATENT AND TRADEMARK OFFICE
CERTIFICATE OF CORRECTION

PATENT NO. : 7,587,622 B2 Page 1 of 1
APPLICATION NO. : 11/326423
DATED : September 8, 2009
INVENTOR(S) : Daniel J. Allen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 749 days.

Signed and Sealed this

Twenty-first Day of September, 2010

David J. Kappos
*Director of the United States Patent and Trademark Office*